United States Patent
Fanty (10) Patent No.: US 6,389,394 B1
(45) Date of Patent: May 14, 2002

(54) METHOD AND APPARATUS FOR IMPROVED SPEECH RECOGNITION BY MODIFYING A PRONUNCIATION DICTIONARY BASED ON PATTERN DEFINITIONS OF ALTERNATE WORD PRONUNCIATIONS

(75) Inventor: Mark Fanty, Norfolk, MA (US)

(73) Assignee: SpeechWorks International, Inc., Boston, MA (US)

(*) Notice: Subject to any disclaimer, the term of this patent is extended or adjusted under 35 U.S.C. 154(b) by 0 days.

(21) Appl. No.: 09/501,341

(22) Filed: Feb. 9, 2000

(51) Int. Cl.[7] ............................................. G10L 15/00
(52) U.S. Cl. ..................................... 704/249; 704/254
(58) Field of Search ................................ 704/260, 254, 704/256, 244, 200, 251, 255, 257, 258, 266, 249, 246

(56) References Cited

U.S. PATENT DOCUMENTS

| | | | | |
|---|---|---|---|---|
| 4,703,504 | A | 10/1987 | Vittorelli | 381/51 |
| 5,109,418 | A | 4/1992 | Van Hemert | 381/43 |
| 5,513,298 | A | 4/1996 | Stanford et al. | 395/2.52 |
| 5,684,925 | A | 11/1997 | Morin et al. | 395/2.63 |
| 5,905,971 | A | * 5/1999 | Howell | 704/257 |
| 6,016,471 | A | * 1/2000 | Kuhn et al. | 704/266 |
| 6,029,132 | A | * 2/2000 | Kuhn et al. | 704/260 |
| 6,230,131 | B1 | * 5/2001 | Kuhn et al. | 704/266 |
| 6,243,680 | B1 | * 6/2001 | Gupta et al. | 704/260 |

* cited by examiner

Primary Examiner—Richemond Dorvil
(74) Attorney, Agent, or Firm—Hale and Dorr LLP (57) ABSTRACT

An approach for automatically modifying a pronunciation dictionary in a speech recognition system based on patterns of alternate pronunciations is described. A representation of the pronunciation dictionary, such as a plurality of dynamically linked phoneme values, is obtained. One or more pattern definitions are obtained. The pattern definitions specify zero or more phonemes to be substituted for zero or more phonemes of all words in the pronunciation dictionary. The linked phoneme values are modified by adding, for each path of each word, alternate paths that use each of the substitute phonemes according to the pattern definitions, thereby creating an expanded set of dynamically linked phoneme values. One or more example pronunciations of a particular word are then obtained. One or more best paths through the expanded set of phoneme values are determined for each of the example pronunciations and used to find the overall best path(s). For the overall best path(s), an alternate word pronunciation is constructed by converting each path into a pronunciation using the format of the pronunciation dictionary. The pronunciation dictionary is modified by adding each alternate word pronunciation. As a result, a modified pronunciation dictionary is created that accounts for alternate pronunciations as actually spoken by users of a particular speech recognition application.

20 Claims, 6 Drawing Sheets

DLN Segment: "pan"

FIGURE 5

METHOD AND APPARATUS FOR IMPROVED SPEECH RECOGNITION BY MODIFYING A PRONUNCIATION DICTIONARY BASED ON PATTERN DEFINITIONS OF ALTERNATE WORD PRONUNCIATIONS

FIELD OF THE INVENTION

The invention relates generally to computer-based or software-based speech recognition systems, and relates more specifically to an approach for improving accuracy of a computer-based speech recognizer by modifying its pronunciation dictionary based on pattern definitions of alternate word pronunciations.

BACKGROUND OF THE INVENTION

Many computer-based or software-based speech recognition systems use a pronunciation dictionary to identify particular words contained in received utterances. The term "utterance" is used herein to refer to one or more sounds generated either by humans or by machines. Examples of an utterance include, but are not limited to, a single sound, any two or more sounds, a single word or two or more words.

The pronunciation dictionary in a phoneme-based recognizer defines words in terms of sets of phonemes, in which each phoneme is one of a small set of speech sounds that are distinguished by the speakers of a particular language. For example, the word "pan" may be characterized by phonemes "p" (the hard "p" sound), "ah" (the short "a" sound), "n". Phonemes are roughly equivalent to the pronunciation symbols that are used in textual dictionaries to aid the reader in determining how to pronounce a word.

The speech recognition system has a set of numeric data ("model") for each of the phonemes. A word is modeled by assembling the models for each phoneme that makes up the word.

In general, a pronunciation dictionary contains data that defines expected pronunciations of utterances. When an utterance is received, the received utterance, or at least a portion of the received utterance, is compared to the expected pronunciations contained in the pronunciation dictionary. An utterance is recognized when the received utterance, or portion thereof, matches the expected pronunciation contained in the pronunciation dictionary.

One of the most important concerns with pronunciation dictionaries is to ensure that expected pronunciations of utterances defined by the pronunciation dictionary accurately reflect actual pronunciations of the utterances. If an actual pronunciation of a particular utterance does not match the expected pronunciation, the speech recognition system may not be successful in recognizing words and may have a flawed pronunciation dictionary.

Actual pronunciations of utterances can be misrepresented for a variety of reasons. For example, in fluent speech, some sounds may be systematically deleted or adjusted. An application program ("application") that uses the speech recognition system may be installed across diverse geographic areas where users have different regional accents. The nature of the application may inherently cause repeated errors in recognition because words are used with unexpected pronunciations. Further, expected pronunciations tend to be somewhat user-dependent. Consequently, a change in the users of a particular application can adversely affect the accuracy of a speech recognition system. This is attributable to different speech characteristics of users, such as different intonations and stresses in pronunciation.

Conventionally, pronunciation dictionaries are updated manually to reflect changes in actual pronunciations of utterances in response to reported problems. When a change in an application or user prevents a speech recognition system from recognizing utterances, the problem is reported to the administrator of the speech recognition system. The administrator then identifies the problem utterances and manually updates the pronunciation dictionary to reflect the changes to the application or users.

Manually updating a pronunciation dictionary to reflect changes to an application or users has several significant drawbacks. These problems, and an approach that addresses them using automatic dictionary updating, are described in detail in co-pending application Ser. No. 09/344,164, filed on Jun. 24, 1999, entitled AUTOMATICALLY DETERMINING THE ACCURACY OF A PRONUNCIATION DICTIONARY IN A SPEECH RECOGNITION SYSTEM, in the name of inventor Etienne Barnard.

Although manual dictionary updating and automatic dictionary updating are useful, these approaches still have drawbacks that are susceptible to improvements. For example, these approaches do not include a mechanism whereby modifications to the dictionary can be generalized or characterized in terms of sound or word patterns. To that extent, they represent responses to the problem that do not recognize the root causes of recognition errors, namely that alternate pronunciations are being used.

In addition, the prior approaches do not effectively improve recognition in the context of a particular or specific application that uses the speech recognition system. The context or vocabulary of a particular application may require speakers to use words that are not adequately or specifically corrected in the prior approaches.

Based on the foregoing, there is a clear need in this field for an improved speech recognition system that can adjust a pronunciation dictionary to account for recognition errors that occur in a particular application.

There is also a need for an improved speech recognition system in which alternate pronunciations are addressed based on generalized sound patterns rather than specific sound differences.

Other needs will become apparent from the following description.

SUMMARY OF THE INVENTION

The foregoing needs, and other needs and objects that will become apparent from the following description, are achieved by the present invention, which comprises, in one aspect, an approach for automatically modifying a pronunciation dictionary in a speech recognition system based on patterns of alternate pronunciations is described. A representation of the pronunciation dictionary, such as a plurality of dynamically linked phoneme values, is obtained. One or more pattern definitions are obtained. The pattern definitions specify zero or more phonemes to be substituted for zero or more phonemes of all words in the pronunciation dictionary. The linked phoneme values are modified by adding, for each path of each word, alternate paths that use each of the substitute phoneme strings according to the pattern definitions, thereby creating an expanded set of dynamically linked phoneme values.

One or more example pronunciations of a particular word are then obtained. One or more best paths through the expanded set of phoneme values are determined for each of the example pronunciations. For each of the best paths, an alternate word pronunciation is constructed by converting each path into a pronunciation using the format of the pronunciation dictionary. The pronunciation dictionary is modified by adding each alternate word pronunciation. As a result, a modified pronunciation dictionary is created that accounts for alternate pronunciations as actually spoken by users of a particular speech recognition application.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE PREFERRED EMBODIMENT

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

An approach for automatically modifying a pronunciation dictionary in a speech recognition system based on patterns of alternate pronunciations is described. In general, a representation of the pronunciation dictionary, such as a dynamic linked network (DLN), is obtained from storage. One or more pattern definitions are obtained from storage. The pattern definitions specify zero or more phonemes to be substituted for zero or more phonemes of all words in the pronunciation dictionary. The DLN is modified by adding, for each path of each word in the DLN, alternate paths that use each of the substitute phoneme strings according to the pattern definitions, thereby creating an expanded DLN.

One or more example pronunciations of a particular word are then obtained. One or more best paths through the expanded DLN are determined for the example pronunciations. For each of the best paths, an alternate word pronunciation is constructed by converting each path into a pronunciation using the format of the pronunciation dictionary. The pronunciation dictionary is modified by adding each alternate word pronunciation. As a result, a modified pronunciation dictionary is created that accounts for alternate pronunciations as actually spoken by users of a particular speech recognition application.

System Overview and Operational Context

Figure 1:
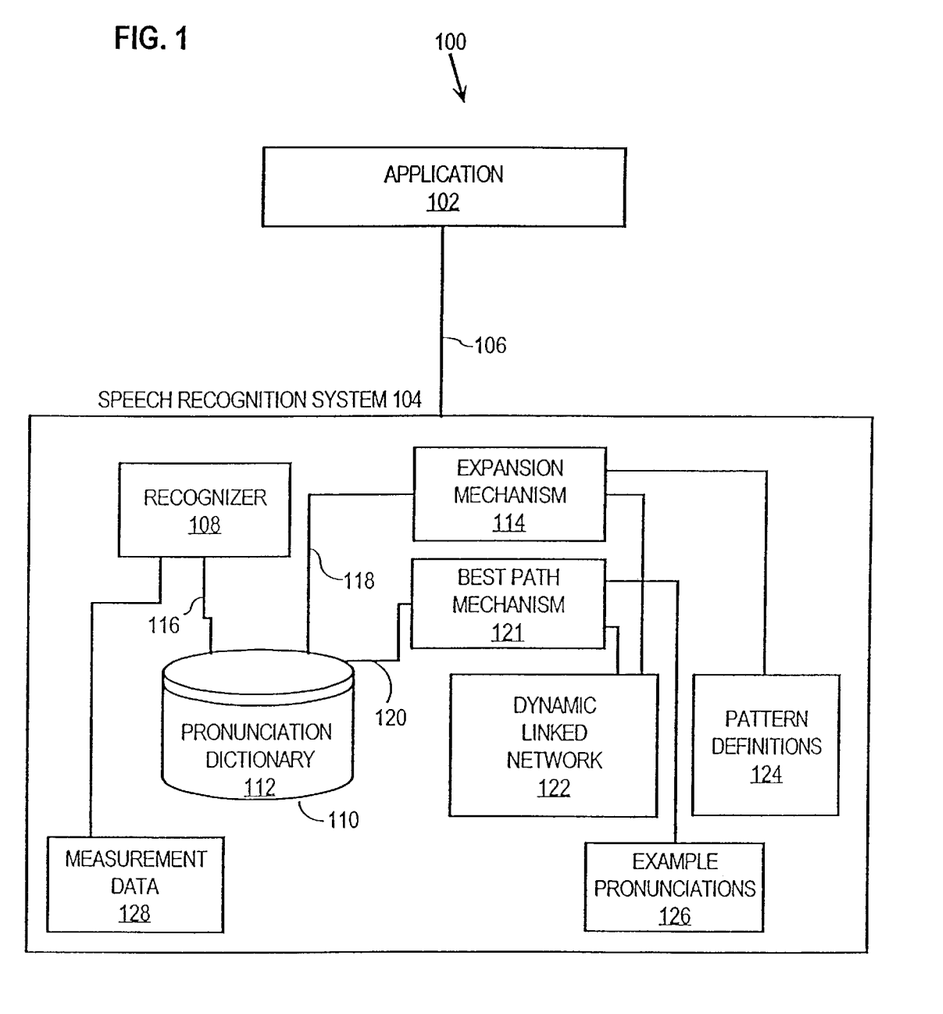
FIG. 1 is a block diagram of a system for automatically modifying a pronunciation dictionary in a speech recognition system according to an embodiment.

FIG. 1 illustrates a system 100 used herein to describe various aspects and features of embodiments of the invention.

System 100 includes an application program ("application") 102 that interacts with a speech recognition system (SRS) 104. Application 102 is any element that uses the speech recognition services of SRS 104. Examples of application 102 include, but are not limited to, a voice-activated system or a telephone-based service, implemented in the form of one or more computer programs or processes, for carrying out services such as airline reservations, securities trading, etc. Application 102 is communicatively coupled to SRS 104 by link 106.

SRS 104 includes a speech recognizer 108, non-volatile storage 110 containing a pronunciation dictionary 112, DLN expansion tool 114, best path tool 121, dynamic linked network 122, and pattern definitions 124. Recognizer 108 is communicatively coupled to non-volatile storage 110 by a link 116. DLN expansion tool 114 is communicatively coupled to non-volatile storage 110 by a link 118. Best path tool is coupled to non-volatile storage 110 by link 120. Links 116, 118, 120 may be implemented using any mechanism to provide for the exchange of data between their respective connected entities. Examples of links 116, 118, 120 include, but are not limited to, network connections, wires, fiber-optic links and wireless communications links. Non-volatile storage 110 may be, for example, one or more disks.

Recognizer 108 is a mechanism that is configured to recognize received utterances using pronunciation dictionary 112. Recognizer 108 may also require interaction with other components in SRS 104 that are not illustrated or described herein so as to avoid obscuring the various features and aspects of the invention. An example of a suitable recognizer is the speech recognizer included in Speech-Works 5.0, commercially available from SpeechWorks International, Inc., of Boston, Mass.

Pronunciation dictionary 112 contains data that defines expected pronunciations for utterances that can be recognized by SRS 104. Pronunciation dictionary 112 is described in more detail in this document.

DLN Expansion Tool 114 and Best Path Tool 121 comprise one or more software elements, programs, or processes that can interoperate with recognizer 116 and pronunciation dictionary 112.

Dynamic linked network (DLN) 122 is a representation of pronunciations from pronunciation dictionary 112. In an embodiment, DLN 122 is a data structure stored in main memory in the form of a graph of phonemes. This provides a fast mechanism of locating particular pronunciations within the pronunciation dictionary. DLN 122 may be searched or otherwise used by recognizer 108 in the course of carrying out recognition.

Pattern Definitions 124 comprise one or more definitions of phoneme substitutions that may be used in a particular alternate pronunciation of a word. DLN Expansion Tool 114 uses Pattern Definitions 124 to determine how to modify DLN 122 for use in modifying pronunciation dictionary 112.

According to an embodiment, DLN Expansion Tool 114 and Best Path Tool 121 are configured for use in modifying pronunciation dictionary 112 in order to account for particular variant pronunciations that speakers may utter in the course of using application 102. The specific configurations and processes of DLN Expansion Tool 114 and Best Path Tool 121 are described further herein.

SRS 104 may include other components not illustrated and described herein to avoid obscuring the various aspects and features of the invention. For example, SRS 104 may include various software development tools and application testing tools available to aid in the development process.

One such tool is a commercially-available package of reusable speech software modules known as DialogModules™ from SpeechWorks International, Inc.

Pronunciation Representation

Figure 2A:
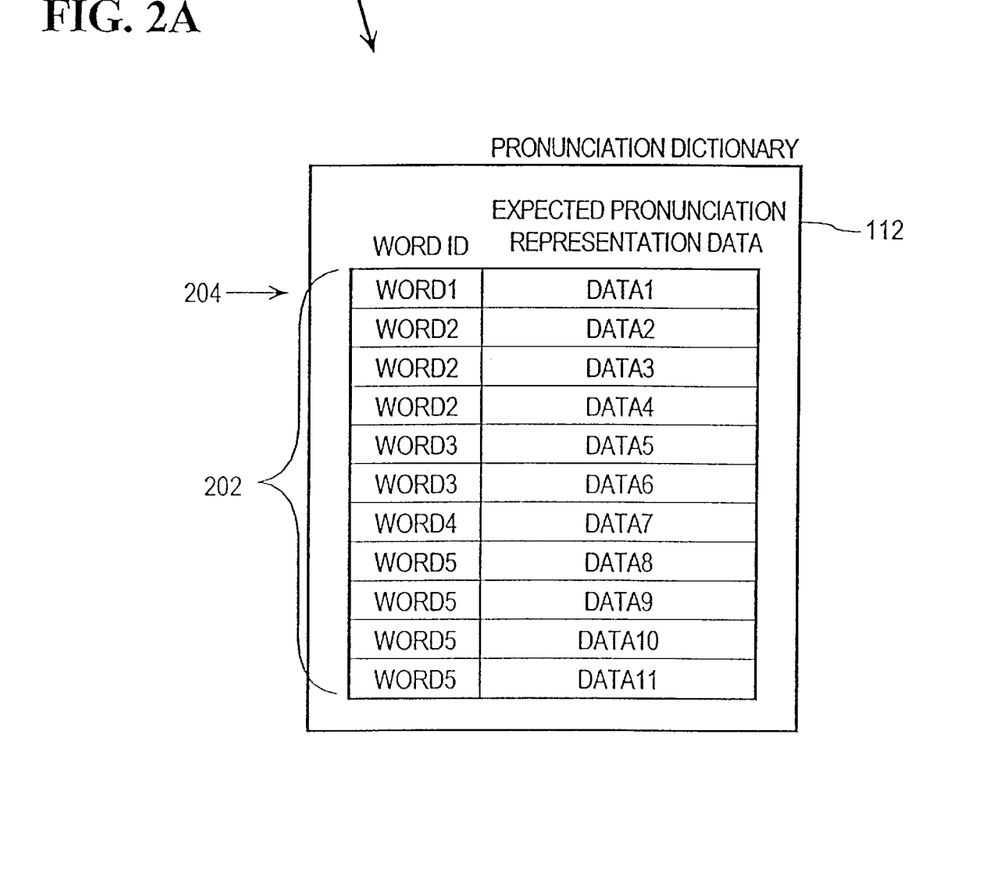
FIG. 2A is a block diagram illustrating a portion of the contents of a pronunciation dictionary according to an embodiment.

FIG. 2A is a block diagram 200 that illustrates an example implementation of pronunciation dictionary 112. Other implementations of pronunciation dictionary 112 may be used and the invention is not limited to any particular implementation of pronunciation dictionary 112.

For purposes of explanation, various embodiments are described herein in the context of recognizing words. However, the embodiments are applicable to any type of utterance. In the present example, pronunciation dictionary 112 contains one or more entries 202, each of which corresponds to a particular expected pronunciation for a particular word. Each entry 202 includes a word identifier value and expected pronunciation representation data.

A word identifier value is any data that specifies a particular word with which an entry 202 is associated. For example, a word identifier may be the actual word with which a particular entry 202 is associated, such as "CAROUSEL," "APPLE" or "ZOO." As another example, a word identifier value may be data other than the word itself, such as WORD1 or WORD2, that allows an entry 202 to be mapped to a particular word. The invention is not limited to any particular implementation of word identifier values.

Expected pronunciation representation data is any data that specifies an expected pronunciation for the word associated with the entry that contains the expected pronunciation representation data. According to one embodiment, expected pronunciation representation data specifies one or more phonemes, also referred to herein as a "phoneme string." As used herein, the term "phoneme" refers to the smallest distinguishable sound in a dialect of a language.

Figure 2B:
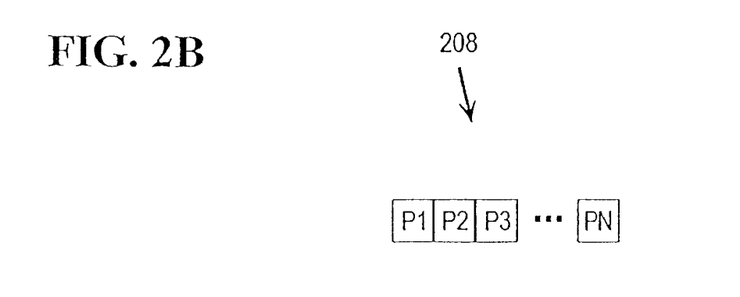
FIG. 2B is a block diagram illustrating the contents of a phoneme string configuration according to an embodiment.

For example, entry 204 is associated with word identifier value WORD1 and contains expected pronunciation representation data DATA1 that defines an expected pronunciation for WORD1. FIG. 2B is a block diagram that illustrates an example phoneme string 208 for DATA1 according to an embodiment. Phoneme string 208 includes N number of phonemes, identified as P1, P2, P3 through PN. Phoneme string 208 defines an expected pronunciation for WORD1. Phoneme string 208 may contain any number of phonemes and the invention is not limited to phoneme strings of any particular length.

As illustrated in FIG. 2, some words in pronunciation dictionary 212, such as WORD1 and WORD4, have only a single entry 202 and therefore only a single expected pronunciation. Other words have multiple expected pronunciations. For example, WORD2 has three entries 202 and therefore three expected pronunciations. WORD3 has two expected pronunciations and WORD5 has four expected pronunciations. Thus, pronunciation dictionary 112 may specify any number of pronunciations for any number of words and the invention is not limited to pronunciation dictionaries having any number of words or any number of expected pronunciations for a particular word.

Figure 3A:
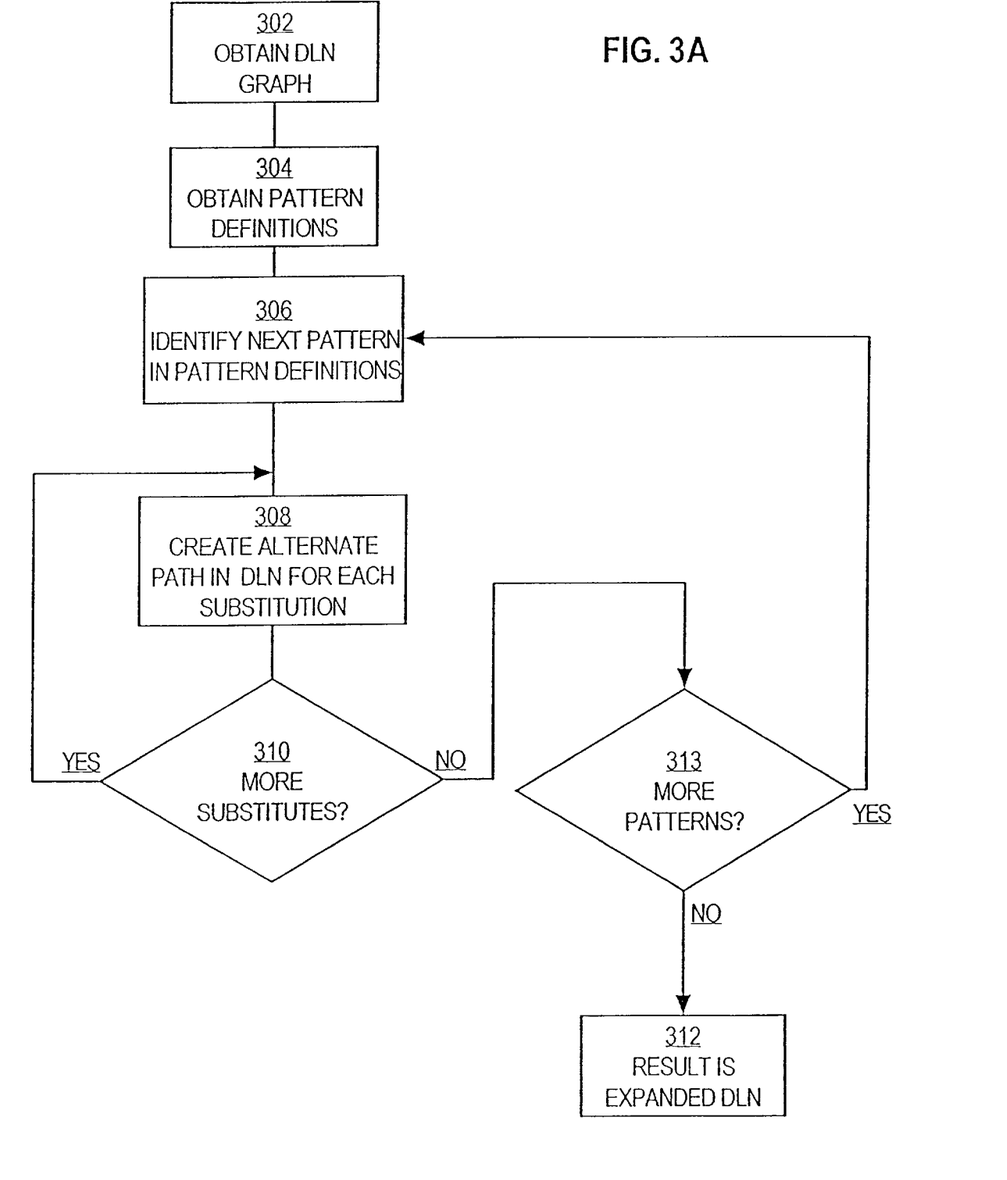
FIG. 3A is a flow diagram showing a portion of a process of modifying a pronunciation dictionary according to an embodiment.

Modifying a Pronunciation Dictionary Based on Pattern Definitions of Alternate Word Pronunciations FIG. 3A is a flow diagram of a process of modifying a pronunciation dictionary based on pattern definitions of alternate word pronunciations. FIG. 3A may represent program instructions or processes that implement DLN Expansion Tool 114.

The process starts by retrieving existing pronunciation information. In the preferred embodiment, existing pronunciation information is in pronunciation dictionary 112 and is compiled into DLN 122. Preferably, DLN 122 is a data structure in the form of a word graph. The compilation is carried out by applying one or more phonological rules to each pronunciation in the pronunciation dictionary 112, and storing the resulting information in DLN.

Figure 4:
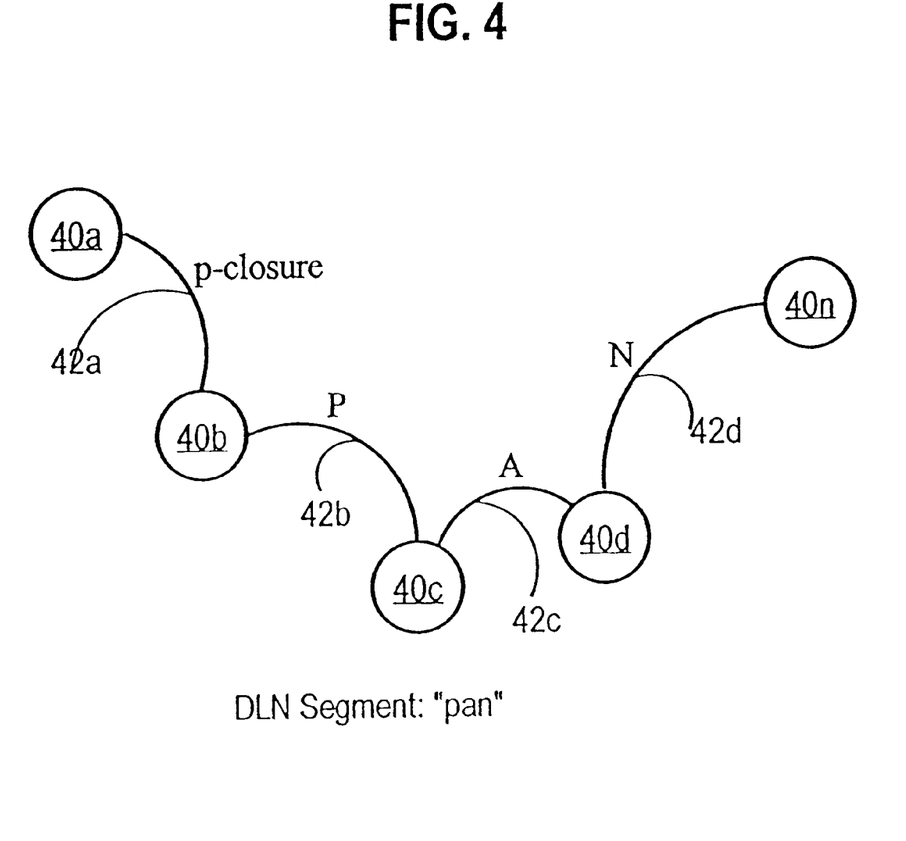
FIG. 4 is a diagram of a path through a dynamic linked network (DLN).

FIG. 4 is a block diagram of a segment of a DLN shown a path through the DLN for one pronunciation of one word, "pan." Each pronunciation is stored as a plurality of paths of nodes that are linked by arcs in the DLN 122. Each path comprises one or more empty nodes 40a–40n. Each arc 42a–42n between two nodes represents a phoneme and contains a phoneme label. In the exemplary path shown in FIG. 4, the word "pan" is represented by phonemes "p-closure," "P", "A", "N", which appear as labels on arcs 42a, 42b, 42c, 42d, respectively.

FIG. 4 illustrates the elements that are present in a complete DLN. A DLN used in actual recognition, such as DLN 122, could be larger and could contain tens of thousands of nodes and perhaps hundreds of thousands of potential paths.

Use of a graph provides useful modeling for alternate pronunciations. For example, for words having alternate flat pronunciations, such as "butter" (which may be pronounced so as to flatten or de-emphasize the prominence of any division of the sounds "but"-"ter"). Each alternate flat pronunciation may be represented as one or more alternate paths in the graph.

Assuming that the DLN graph has been created and stored in memory, the DLN graph is obtained or read, as indicated by block 302. Block 304 through block 312 provide a process of modifying the DLN graph so that alternate pronunciations are directly reflected in the DLN according to one or more pre-defined patterns, thereby creating an expanded DLN.

In block 304, pattern definitions are obtained. For example, pattern definitions 124 are read. The patterns can include context information, and each pattern has a pattern type. For example, a particular pattern may be a substitution pattern, a deletion pattern, or an insertion pattern.

A substitution pattern may comprise, for example, information that instructs the speech recognition system, "If the dictionary has an 'e' sound, also allow an 'uh' sound." Some substitution patterns address the problem that words in common speech may have vowels that are reduced by the speaker. For example, the word "Microsoft" is literally pronounced "MIKE-ROW-SOFT," but is commonly pronounced "MIKE-RUH-SOFT." Thus, a word part that is canonically an "O" sound may be articulated as an "UH" sound. Thus, one example pattern instructs the speech recognition system that, for every vowel, a schwa should be substituted.

A deletion pattern may comprise, for example, information that instructs the speech recognition system, "Delete a particular sound from the phoneme dictionary when attempting to recognize the associated word."

A pattern may refer to more than one phoneme. For example, a pattern may specify substitution of a cluster of two or more phonemes with one or more replacement phonemes. When a pattern specifies a substitution of multiple phonemes with zero or a lesser number of replacement phonemes, the pattern is effectively a deletion pattern. Conversely, a pattern may specify that one phoneme should be replaced with two or more substitute phonemes.

Patterns should be distinguished from rules. Rules dictate behavior of a speech recognizer that occurs whenever the recognizer carries out recognition. Patterns are suggested alternatives that are used only during pronunciation learning when words to be recognized are known and recognition errors are not possible.

In practice, patterns may be generated by comparing a set of pronunciations that are generated for a vocabulary using a standard pronunciation generator tool, such as NAVRules, and comparing those pronunciations to the pronunciation dictionary of the speech recognition system, or by comparing an existing pronunciation dictionary with manually tuned pronunciations.

In one embodiment, the patterns are stored in the form of a text file. Each pattern is delimited by the tag "PAT" followed by a text representation of one or more phonemes. Each line thereafter beginning with "SUB" contains a text representation of the phoneme(s) that are to be substituted for the current phoneme(s). For example, one pattern could comprise the lines:

| PAT | OW |
|-----|-----|
| SUB | AX |
| SUB | NUL |

In this example, the tag "PAT" identifies a pattern. The text "OW" represents a phoneme for a short "O" sound. The text "AX" indicates that the short "A" sound should be considered as a substitute. The text "NUL" (null) indicates that another pattern involves deleting the "OW" sound completely. Other patterns may be included in the text file.

In block 306, the next pattern in the pattern definitions is identified. This pattern is termed the "current" pattern. A pattern may refer to more than one phoneme. For example, a pattern may be:

| PAT | OW | ER |
|-----|-----|-----|
| SUB | AO | R |

In this example, the sequence "ow er" must be found in the DLN and the whole sequence is given the alternative "ao r". In block 308, an alternate path is created in the DLN for each match to the pattern. In the above example, if the sequence "ow er" occurs 3 times in the DLN, then all 3 instances are expanded with the alternative "ao r". If there is more than one substitution specified for the current pattern definition, then the additional phoneme substitutions are processed, as indicated by the loop formed by block 310 and block 308 If there are additional patterns in the pattern definition file, then the additional patterns are processed, as indicated by the loop formed by block 313 and block 306.

The process iterates until all patterns have been considered and all phonemes of each pattern have been considered. As a result, an expanded DLN is created and stored, as indicated by block 312. The expanded DLN is populated by numerous additional paths resulting from addition of new phoneme arcs according to the patterns in the pattern definitions.

When the DLN graph is modified with all patterns that are defined, the DLN graph may become highly complicated and also inaccurate at recognition because of the number of potential pronunciations that need to be considered. Because the patterns are not associated with particular vocabulary words, modification of the DLN to incorporate the patterns results in a very large modified DLN that cannot be used for general purpose speech recognition. When the modified DLN is used with a set of different pronunciations for the same word, however, it may be used to rapidly find a best alternate path or pronunciation for that word.

Figure 3B:
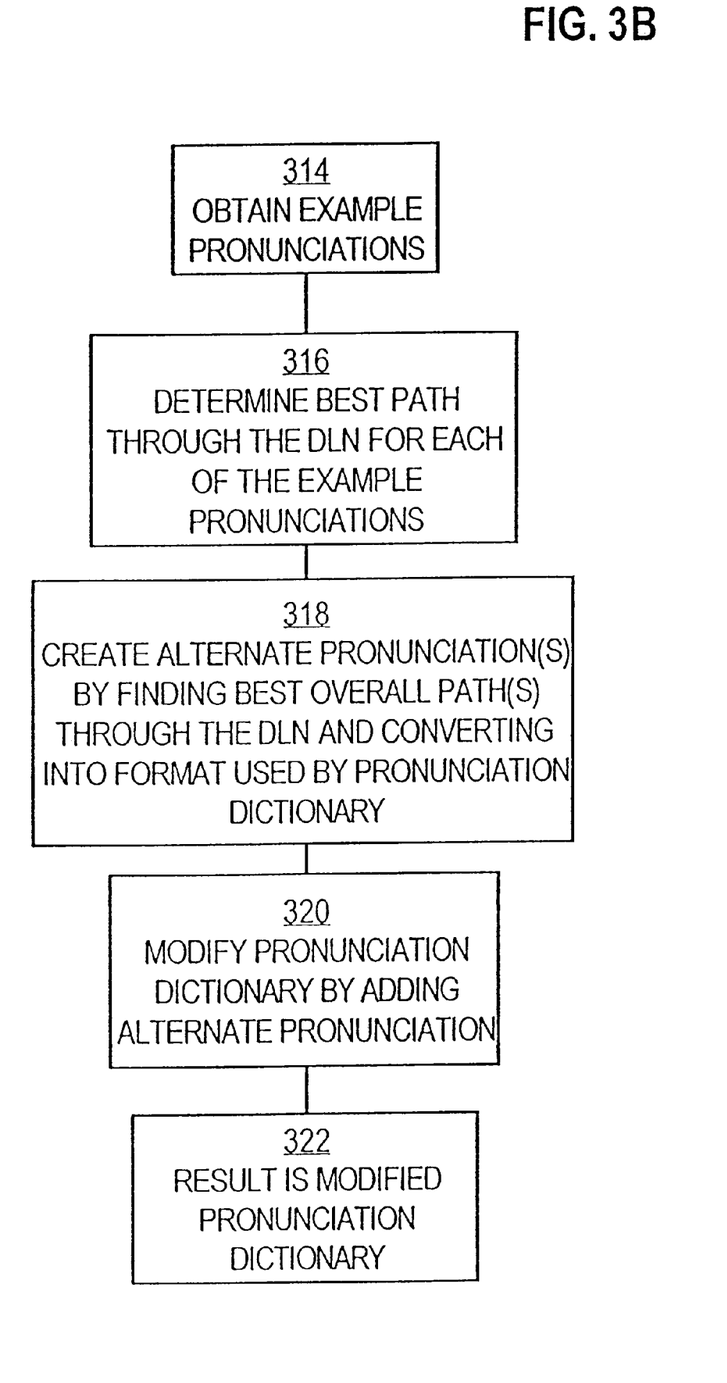
FIG. 3B is a flow diagram showing a portion of a process of modifying a pronunciation dictionary according to an embodiment.

FIG. 3B is a flow diagram of a process of using the modified DLN to create alternate pronunciations. FIG. 3B may represent program instructions or processes that are carried out by Best Path Tool 121.

Generally, FIG. 3B involves applying the modified DLN graph to example empirical pronunciations of one specific word under consideration. The speech recognition system is configured to repeatedly carry out test recognition on different exemplary spoken pronunciations of the subject word. Since there is only the one word in the DLN, there is no possibility of misrecognition. The process is used solely to find the highest scoring path through the DLN. The speech recognition system is configured to generate data indicating which arcs are used during recognition of the subject word. This information is used to find the best paths through the DLN, i.e., one or more paths that results in the highest scores for recognition of the subject word.

In block 314, example pronunciations are obtained. The example pronunciations typically are correct pronunciations by actual speakers and are recorded during use of application 102 by such speakers. In an embodiment, at least five (5) example pronunciations are used as test data, and preferably a much larger number of example pronunciations are used. It is desirable to use as large a number of pronunciations as possible in order to reduce the likelihood of modifying the pronunciation dictionary based on recognizer errors that do not derive from genuine alternative pronunciations.

The example pronunciations may be obtained from measurement data 128, which may comprise one or more files produced by the speech recognition system during execution. Contemporary speech recognition systems, such as SpeechWorks 5.0 from SpeechWorks International, Inc., generate slee logs and waveform information during operation. Example pronunciations for use as test data may be obtained from the slee logs and waveform information.

In the preferred embodiment, only those example pronunciations that have a high recognition confidence score, or were confirmed by the speaker at the time the pronunciation was uttered, are selected for use as test data. This is advantageous in that it tends to cause the pronunciation dictionary to be modified only based upon valid alternate pronunciations, and not errors. For example, assume that a speaker utters "MICROSOFT," which is recognized but with a low confidence score. If the slee log shows that the next recognition context is a confirmation context, and the speaker answered "YES" when asked to confirm the recognition, and the YES utterance earned a high confidence value, then that utterance will be used.

In block 316, the best bath through the expanded DLN is determined for each of the example pronunciations. The best path information may be determined by reading the measurement data 128 after carrying out recognition using the expanded DLN with the example pronunciations. Each time a recognition is carried out, the recognition system generates measurement data that include, among other information, a record of the paths that were followed through the DLN. The paths may be extracted by reading the measurement data 128 using a separate filter program.

After running the recognizer on several sample pronunciations of the word in the DLN, it is possible to generate a count for each arc in the DLN of the number of times that arc was part of a best path. Any of a number of well known graph path search algorithms may applied to the arcs and counts in the DLN in order to result in one or more overall best paths through the. In one embodiment, the overall best path is determined by computing and storing, for each path through the DLN, the geometric mean of the number of times each arc was followed. This has been found to yield better results than the arithmetic average because the geometric mean will tend to "punish" isolated arcs that are followed a low number of times.

In block 318, one or more alternate pronunciations are created in the pronunciation dictionary, by converting each of the overall best paths to a format usable by the pronunciation dictionary. The foregoing process yields a best path, however, the path is in an expanded form that appears in the DLN, and cannot be used for creating or modifying the pronunciation dictionary itself. For example, the path may include arcs for sounds that are not literally represented in the pronunciation dictionary, such as closure sounds (t-closure, p-closure, etc.). Therefore, the path is converted to a base form that can be used to create or modify the pronunciation dictionary. This may be carried out by applying one or more rules or heuristics that convert the path to dictionary form. For example, the sequence "tcl t" is replaced with just "t".

In block 320, the pronunciation dictionary is modified by adding each converted alternate pronunciation to the dictionary. The result is a modified pronunciation dictionary, as shown by block 322. The modified pronunciation dictionary is more accurate and successful in carrying out recognition during use of application 102. As a result of the foregoing process, a pronunciation dictionary is rapidly and efficiently converted to account for alternative pronunciations and for pronunciations that are actually experienced by an application upon field deployment.

When application 102 is used with the modified pronunciation dictionary, it will not encounter problems that could be caused from use of the expanded DLN. Preferably, when recognizer 108 initializes, it re-builds DLN 122 based on the current pronunciation dictionary. Thus, DLN 122 is no longer expanded, and reflects the modified pronunciation dictionary.

The foregoing process may be iteratively repeated for any number of words under consideration. For example, if the speech recognition system is deployed with a particular application program, and empirical data from use of the application indicates that recognition is repeatedly failing for several different words, the process may be repeated for each word. Utterances containing more than one word may also be used. The individual words in the utterance will be separately optimized.

In an alternate embodiment, for every node, a separate process determines whether, independent of the possible substitutions that have been added for each arc based on the patterns, there is some other phoneme that scores well in recognition, and was not in the patterns. If such a phoneme scores much better, then it is proposed as a substitution.

Although the foregoing process has been illustrated and described as an off-line process, in which the pronunciation dictionary is modified and then deployed for real-time use in the modified form, with appropriate computing resources the process could be implemented in an on-line form. For example, as alternate pronunciations are recognized, running counts on paths through the expanded DLN may be created and stored. The counts may be continually evaluated to determine whether the best path has been identified. If so, the pronunciation dictionary and recognizer (unexpanded) DLN could be updated. Thus, in this embodiment, the pronunciation dictionary may be updated using the foregoing process as alternate pronunciations are recognized.

Implementation Mechanisms

The approach described herein may be implemented in any form of computer software, or in firmware, or in hardware circuitry, or as a combination of computer software and hardware circuitry. Accordingly, the invention is not limited to a particular computer software or hardware circuitry implementation. For example, as illustrated in FIG. 1, the approach may be implemented in DLN Expansion Tool 114 and Best Path Tool 121 as part of SRS 104. As another example, the approach may be implemented as part of recognizer 108. The approach may also be implemented as a stand-alone mechanism located external to SRS 104 that is periodically used to update pronunciation dictionary 112. The approach also may be implemented as a real time process in the manner described above.

Figure 5:
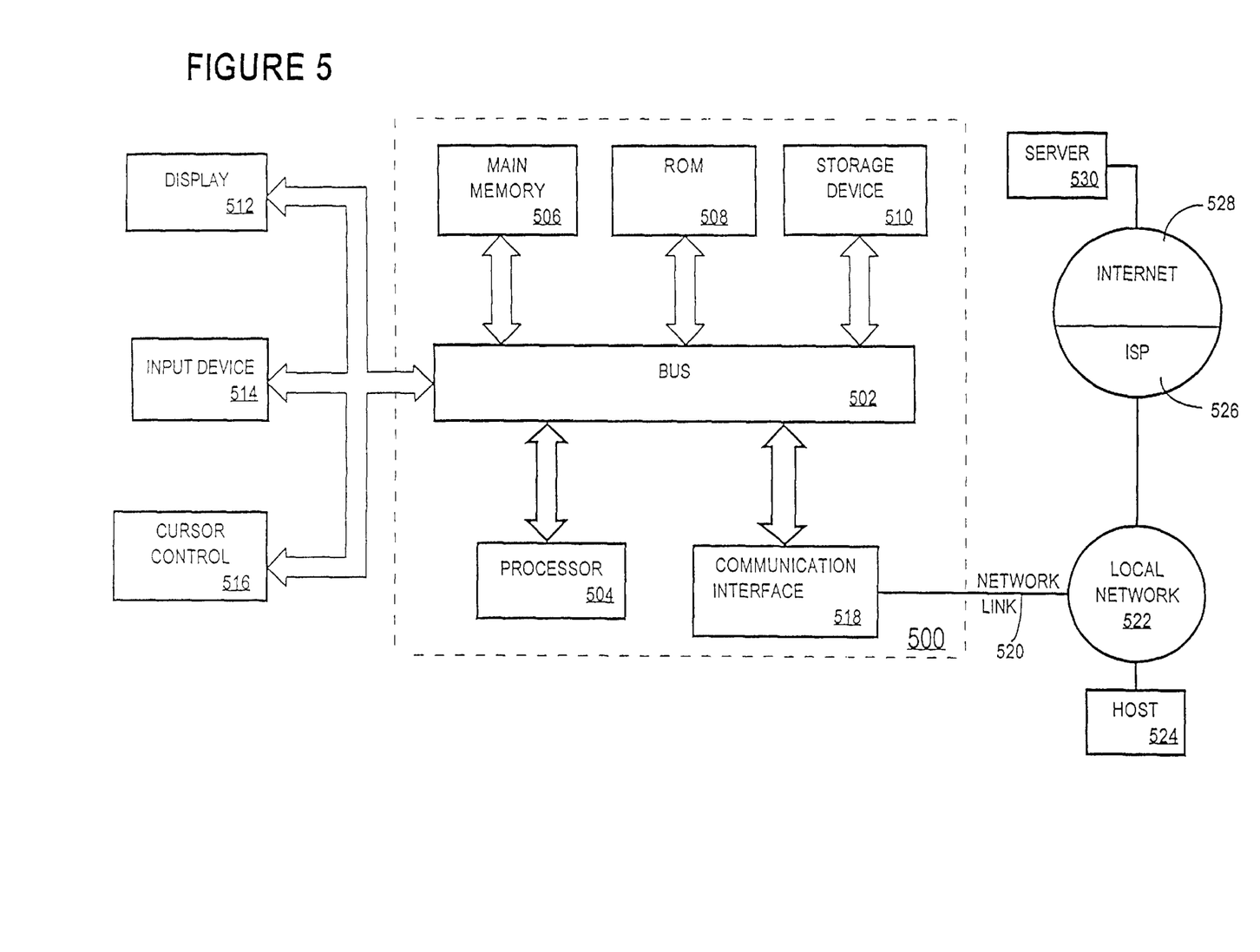
FIG. 5 is a block diagram of a computer system on which embodiments may be implemented.

FIG. 5 is a block diagram that illustrates an example computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled by bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for automatically determining the accuracy of a pronunciation dictionary. According to one embodiment of the invention, a mechanism for automatically determining the accuracy of a pronunciation dictionary is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for automatically determining the accuracy of a pronunciation dictionary as described herein.

The received code may be executed by processor 504 as it is received, and/or stored in storage device 510, or other non-volatile storage for later execution. In this manner, computer system 500 may obtain application code in the form of a carrier wave.

The approach described in this document for automatically determining the accuracy of a pronunciation dictionary provides several benefits and advantages over prior approaches. In particular, the use of an automated mechanism reduces the amount of human resources required to determine the accuracy of a pronunciation dictionary. This allows the accuracy of a pronunciation dictionary to be periodically assessed and corrected without having to wait for users to identify problems with particular words. Moreover, the automated approach allows a pronunciation dictionary to be more quickly updated to reflect changes to an application, users or context than prior manual approaches. The automated nature of the approach may also increase the accuracy of pronunciation dictionary 112 since: (1) the approach can account for properties of speech recognition system 104; and (2) manually-adjusted pronunciations can be less accurate because of biased linguistic preconceptions.

In the foregoing specification, particular embodiments have been described. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for modifying a pronunciation dictionary in a speech recognition system to include one or more alternate pronunciations, wherein each pronunciation in the pronunciation dictionary is represented as one or more dynamically linked phoneme values, the method comprising the computer-implemented steps of:
   receiving one or more phoneme substitution patterns that define one or more substitute phoneme values for one or more of the dynamically linked phoneme values;
   adding the substitute phoneme values and new links therefor to the dynamically linked phoneme values;
   determining one or more best paths among the dynamically linked phoneme values for a particular word under consideration; and
   modifying the pronunciation dictionary by adding a pronunciation that represents each of the best paths.

2. A method as recited in claim 1, wherein receiving one or more phoneme substitution patterns comprises the step of receiving one or more phoneme substitution patterns each comprising (a) information identifying a first phoneme and (b) one or more phonemes that are to be substituted for the first phoneme during recognition of a word containing the first phoneme.

3. A method as recited in claim 1, wherein receiving one or more phoneme substitution pattern comprises the step of receiving at least one phoneme substitution pattern that comprises (a) information identifying a first phoneme and (b) information indicating that the first phoneme is to be deleted from the dynamically linked phoneme values.

4. A method as recited in claim 1, wherein determining one or more best paths further comprises the steps of receiving two or more example pronunciations for a particular word under consideration and determining one or more best paths among the dynamically linked phoneme values for each of the example pronunciations.

5. A method as recited in claim 1, wherein determining one or more best paths further comprises the steps of receiving two or more example pronunciations for a particular word under consideration based on measurement data that is generated and stored by the speech recognition system during its execution.

6. A method as recited in claim 1, wherein determining one or more best paths further comprises the steps of converting each of the best paths into pronunciations according to a format of representing pronunciations that is used in the pronunciation dictionary.

7. A method for modifying a pronunciation dictionary in a speech recognition system to include one or more alternate pronunciations, wherein each pronunciation in the pronunciation dictionary is represented during use of the speech recognition system as one or more paths among nodes in a dynamically linked phoneme network, wherein phonemes in each pronunciation are represented by arcs between nodes in the network, the method comprising the computer-implemented steps of:

receiving one or more phoneme substitution patterns that define one or more substitute values for one or more of the phonemes in the network;

adding the substitute values and new arcs therefor to the network;

determining one or more best paths through the network for a particular word under consideration; and     modifying the pronunciation dictionary by adding a pronunciation that represents each of the best paths.

8. A method as recited in claim 7, wherein the step of receiving one or more phoneme substitution patterns comprises the step of receiving one or more phoneme substitution patterns each comprising (a) information identifying a first phoneme and (b) one or more phonemes that are to be substituted for the first phoneme in the network.

9. A method as recited in claim 7, wherein the step of receiving one or more phoneme substitution patterns comprises receiving at least one phoneme substitution pattern that comprises (a) information identifying a first phoneme and (b) information indicating that the first phoneme is to be deleted from the network.

10. A method as recited in claim 7, wherein determining one or more best paths further comprises the steps of receiving two or more example pronunciations for a particular word under consideration and determining one or more best paths through the network for each of the example pronunciations.

11. A method as recited in claim 7, wherein determining one or more best paths further comprises the steps of receiving two or more example pronunciations for a particular word under consideration based on measurement data that is generated and stored by the speech recognition system during its execution.

12. A method as recited in claim 7, wherein determining one or more best paths further comprises the steps of converting each of the best paths into pronunciations according to a format of representing pronunciations that is used in the pronunciation dictionary.

13. A method for modifying a pronunciation dictionary in a speech recognition system to include one or more alternate pronunciations, wherein each pronunciation in the pronunciation dictionary is represented during use of the speech recognition system as one or more paths among nodes in a dynamically linked phoneme network, wherein phonemes in each pronunciation are represented by arcs between nodes in the network, the method comprising the computer-implemented steps of:

receiving one or more phoneme substitution patterns that define one or more substitute values for one or more of the phonemes in the network;

adding the substitute values and new arcs therefor to the network;

receiving a plurality of example pronunciations for a particular word under consideration;

determining one or more best paths through the network for the word under consideration by carrying out recognition of the example pronunciations using the network; and     modifying the pronunciation dictionary by adding a pronunciation that represents each of the best paths.

14. A computer-readable medium carrying one or more sequences of one or more instructions for modifying a pronunciation dictionary in a speech recognition system to include one or more alternate pronunciations, wherein each pronunciation in the pronunciation dictionary is represented as one or more dynamically linked phoneme values, the one or more sequences of one or more instructions including instructions which, when executed by one or more processors, cause the one or more processors to perform the steps of:

receiving one or more phoneme substitution patterns that define one or more substitute phoneme values for one or more of the dynamically linked phoneme values;

adding the substitute phoneme values and new links therefor to the dynamically linked phoneme values;

determining one or more best paths among the dynamically linked phoneme values for a particular word under consideration; and     modifying the pronunciation dictionary by adding a pronunciation that represents each of the best paths.

15. A computer-readable medium as recited in claim 14, wherein instructions for receiving one or more phoneme substitution patterns further comprise instructions for receiving one or more phoneme substitution patterns each comprising (a) information identifying a first phoneme and (b) one or more phonemes that are to be substituted for the first phoneme during recognition of a word containing the first phoneme.

16. A computer-readable medium as recited in claim 14, wherein instructions for receiving one or more phoneme substitution patterns further comprise instructions for receiving at least one phoneme substitution pattern that comprises (a) information identifying a first phoneme and (b) information indicating that the first phoneme is to be deleted from the dynamically linked phoneme values.

17. A computer-readable medium as recited in claim 14, wherein instructions for determining one or more best paths further comprise instructions for receiving two or more example pronunciations for a particular word under consideration and determining one or more best paths among the dynamically linked phoneme values for each of the example pronunciations.

18. A computer-readable medium as recited in claim 14, wherein instructions for determining one or more best paths further comprise instructions for receiving two or more example pronunciations for a particular word under consideration based on measurement data that is generated and stored by the speech recognition system during its execution.

19. A computer-readable medium as recited in claim 14, wherein instructions for determining one or more best paths further comprise instructions for converting each of the best paths into pronunciations according to a format of representing pronunciations that is used in the pronunciation dictionary.

20. A speech recognition apparatus comprising:

a storage medium having a pronunciation dictionary stored thereon, wherein each pronunciation in the pronunciation dictionary is represented as one or more dynamically linked phoneme values; and an expansion mechanism and a best path mechanism communicatively coupled to the storage medium, wherein the expansion mechanism and the best path mechanism are configured to modify a pronunciation dictionary in a speech recognition system to include one or more alternate pronunciations by:

receiving one or more phoneme substitution patterns that define one or more substitute phoneme values for one or more of the dynamically linked phoneme values;

adding the substitute phoneme values and new links therefor to the dynamically linked phoneme values;

determining one or more best paths among the dynamically linked phoneme values for a particular word under consideration; and modifying the pronunciation dictionary by adding a pronunciation that represents each of the best paths.

* * * * *